Aug. 17, 1943. W. L. POLLARD 2,327,214
SPEED RATIO CONTROL APPARATUS
Filed July 5, 1941    2 Sheets-Sheet 1
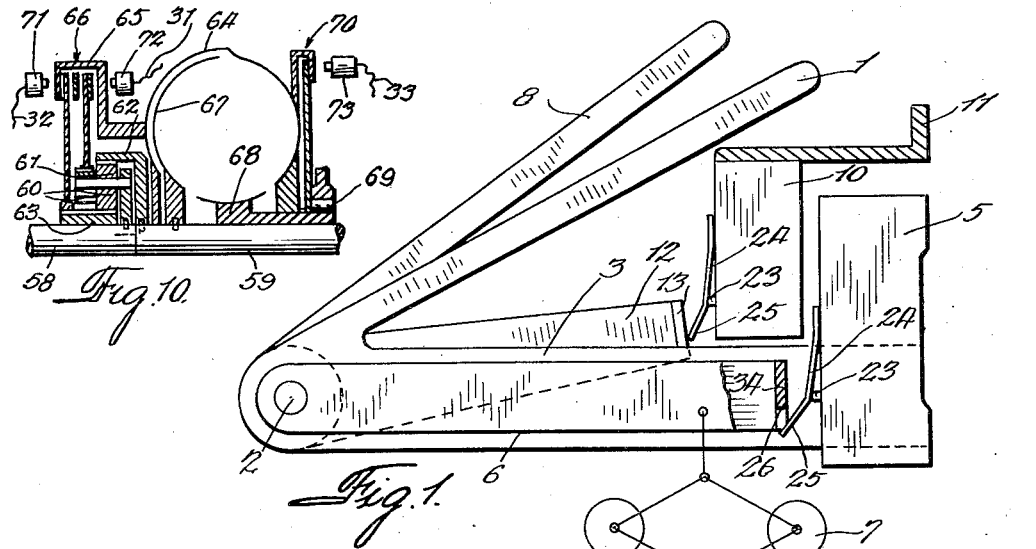
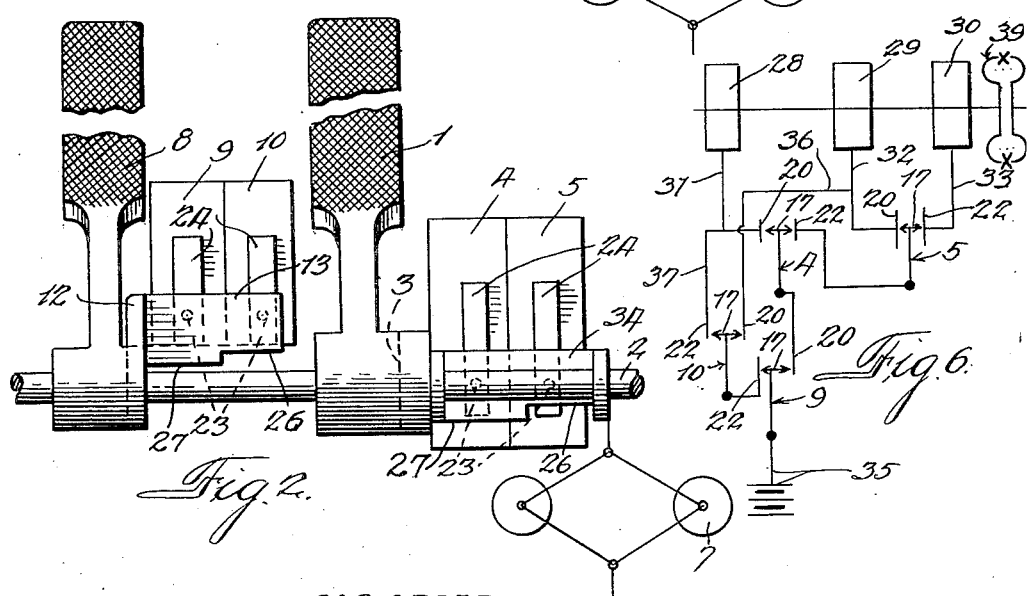
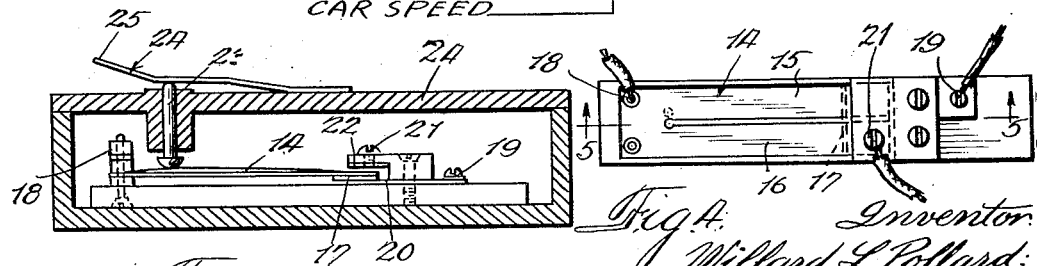
Inventor
Willard L. Pollard
By Thiess, Olsen + Mecklenburger
Attys

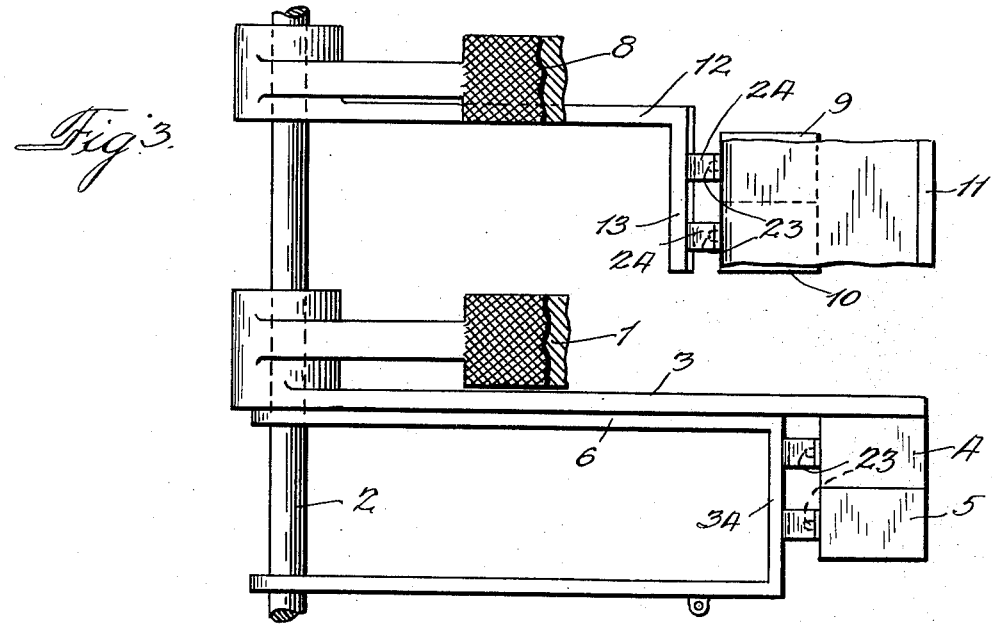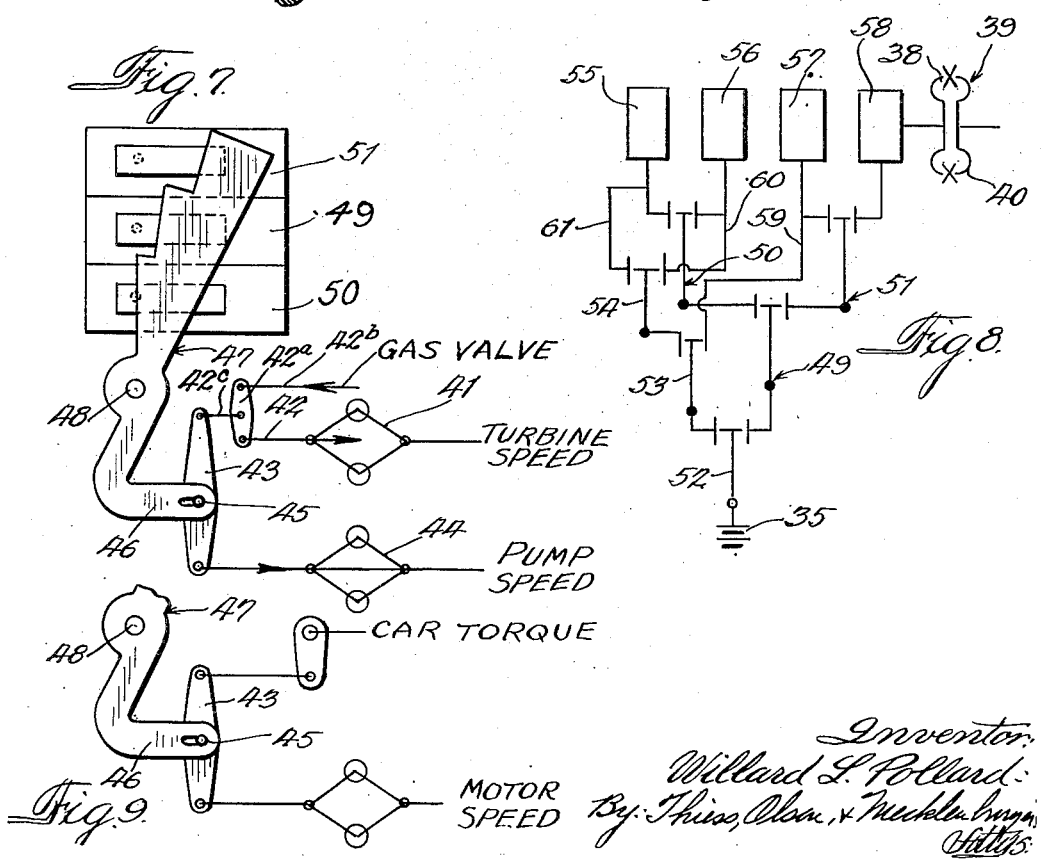

Patented Aug. 17, 1943

2,327,214

UNITED STATES PATENT OFFICE 2,327,214

SPEED RATIO CONTROL APPARATUS

Willard L. Pollard, Evanston, Ill.

Application July 5, 1941, Serial No. 401,162

8 Claims. (Cl. 74—189.5)

My invention relates to speed ratio control apparatus.

One of the objects of my invention is to provide a control apparatus for controlling speed ratios in which there will be no possibility of a time overlap of any two controls and in which there will be no possibility of a time gap between any two controls.

A further object of my invention is to provide a control apparatus for controlling the speed ratio of a transmission in which an extremely small movement of the control member will effect the shift from one speed ratio to another, thereby enabling accurate control of the shift with a relatively small range of movement of the control member.

Further objects and advantages of the invention will be apparent from the description and claims.

In the drawings, in which several embodiments of my invention are shown,

Figure 1 is a somewhat diagrammatic elevational view of a control device;

Fig. 2 is a view from the left of Fig. 1;

Fig. 3 is a plan view of Fig. 1;

Fig. 4 is a plan view of a switch mechanism used;

Fig. 5 is a sectional view on the line 5—5 of Fig. 4 showing, in addition, the casing in section;

Fig. 6 is a wiring diagram;

Fig. 7 is a diagrammatic plan view showing another form;

Fig. 8 is a wiring diagram for Fig. 7; and

Fig. 9 is a diagrammatic view showing a modification of Fig. 7;

Fig. 10 is an axial sectional view of a transmission controllable by the apparatus shown in Figs. 1 to 6, inclusive.

Referring to the drawings in detail, and first to Figs. 1-6, incl., the construction shown therein comprises a lever or pedal 1 which may be the accelerator pedal of an automobile, pivotally mounted on a shaft 2 and connected in any suitable manner to control the gas valve, an arm 3 which may be integral with the pedal, a pair of two-way snap action, spring-biased switches 4 and 5 carried by said arm, a switch actuating lever 6 also rockably mounted on the shaft 2, for successively operating the switches 4 and 5, and a flyball governor 7 which may be controlled by the car speed for determining the position of the switch actuating lever 6. The arm 3 and the switch mechanism carried thereby may be considered as a member oscillatable about the axis of the shaft 2, and the lever 6 may be considered as another member oscillatable about said axis. The construction also includes another lever 8, which may be a pedal controlled by the left foot of the driver, a pair of switches 9 and 10 mounted on a fixed support 11, of the same general type as the switches 4 and 5, and a switch actuating lever 12 which may be integral with the pedal 8, having a laterally extending projection 13 for successively actuating the switches 9 and 10. The two switches 4 and 5 on the accelerator pedal may be used in the automatic control of the shifting of the gears, and the two fixed switches 9 and 10 controlled by the left-hand pedal may be used for overruling the automatic control.

In general the construction and arrangement is such that when all of the switches are in what may be termed their normal spring biased position, the car will be in low gear; that when the switch 4 is operated to put it in what may be termed its abnormal condition, the car will be in intermediate gear, and when both switches 4 and 5 are placed in their abnormal condition, the car will be in high gear. For this purpose, a switch, such as shown in Figs. 4 and 5, may be employed, which may be of the general type described in Patent No. 1,780,758. As here shown, this switch comprises a bifurcated, warped, spring, sheet metal, snap switch member 14, similar to the member 5 shown in the above patent, the bifurcations 15 and 16 of the member being turned toward each other slightly and united by the contact member 17, a binding terminal 18 connected with this snap contact, a binding terminal 19 electrically connected with a contact 20 engaged by the snap switch member 14, and a binding terminal 21 electrically connected with the other contact 22 of the switch. The push pin 23 may be slidably mounted in an opening in the cover 24 for the switch and moved to operate the switch. This spring snap switch member 14 is so biased as to normally hold the movable contact 17 in engagement with the contact 20 but so that when the push pin 23 is pressed downwardly, the switch will snap to an abnormal position in engagement with the contact 22. A leaf spring 24 is provided, an intermediate portion of which engages the push pin 23, and the upturned edge 25 of which is engageable by the actuating edges 26 and 27 of the levers 1 and 8. These edges are of stepped formation, as shown in Fig. 2, to effectuate successive operation of the switches.

Referring to Fig. 6, this shows diagrammatically three gear shift operating devices 28, 29, and 30 designed and electrically connected with the control switches 4, 5, 9, and 10 in such a way that when the conductor 31 only is energized the car will be in low gear; so that when the conductor 32 only is energized the car will be in intermediate gear, and such that when the conductor 33 only is energized the car will be in high gear.

With this construction and arrangement, and disregarding for the present the operation of the two switches 9 and 10 controlled by the left-hand pedal, and assuming that the two automatically controlled switches are normally in their left-hand position and that the two switches controlled by the left-hand pedal are normally in their right-hand position, it will be seen that in the normal position of the switches, the left-hand one 31 only of the wires 31, 32, and 33 will be energized and the car will therefore be in low gear. If, now, the joint control of the switches exercised by the accelerator controlled lever 3 carrying the switches 4 and 5 and the speed controlled lever 6 having the switch actuating edge 26 becomes such that the left-hand switch 4 is shifted to its abnormal position to energize the contact 22, the conductor 31 will be de-energized and the conductor 32 energized, causing the car to be placed in intermediate gear. If, later, the joint control exercised by the accelerator pedal 1 and governor controlled lever 6 becomes such that the right-hand switch 5 is shifted to abnormal position, the left-hand switch 4 remaining in abnormal position, the conductor 32 will be de-energized and the conductor 33 will be energized, causing the car to be put in high gear.

The actuating edge 26 of the lever 6 is so designed, as shown in Fig. 2, that the left-hand side of the edge will operate the left-hand switch 4 before the right-hand edge of this lever will operate the right-hand switch 5. The crossbar 34 of the lever 6 is so designed that it will hold the switches 4 and 5 in abnormal position, once they have been operated, during any further downward movement of the accelerator pedal 1. With this construction, it will be seen that the farther down the accelerator pedal 1 is depressed, the higher will be the speed at which the shifts from lower to higher gear will be effected. Mechanisms which might be used for effecting the desired gear changes are well known, such, for example, as are shown diagrammatically in the patent to Vincent No. 2,008,231, and in more detail in the patent to Kelley No. 2,211,233.

It will also be seen that if the load or drag on the car increases, as, for example, on travelling on an increasing grade, if the car speed drops to an abnormal position with respect to the position of the accelerator pedal, the car will automatically go into a lower gear.

In order to enable the driver to overrule the automatic control by means of the left-hand pedal, the switches 9 and 10 are connected, as shown in Fig. 6. As indicated above, it is assumed that these switches 9 and 10 are normally spring biased to stand in their right-hand position. Under these conditions, if the left-hand pedal is not depressed at all, both switches stand in their right-hand position and the battery 35 is connected with the automatic side of the control. If, however, the left-hand pedal 8 is pressed down to actuate the left-hand switch 9 and place it in abnormal position, in which it engages the contact 22, the automatic side of the control will be disconnected and the circuit will be completed to the conductor 32, through the contact 22, switch 10, contact 20, and conductor 36, placing the car in intermediate gear regardless of the position of the automatic control. This condition may be desirable in going down a steep hill. If it should be desirable to place the car in low gear regardless of the condition of the automatic apparatus, the left-hand pedal 8 may be still further depressed so that both the switches 9 and 10 will be placed in their abnormal position, thus energizing the conductor 31 and placing the car in low gear. The circuit under these conditions will be from the battery 35, through the switch 9, the switch contact 22, switch 10, switch contact 22 and conductor 37.

In the construction shown in Fig. 7, a triple control is exercised, one of which controls may be influenced by the speed of the driven turbine member 38 of a hydraulic coupling 39 or hydraulic torque converter, another of which may be influenced by the speed of the driving pump member 40 of the coupler or converter, and another of which may be influenced by the position of the gas valve actuator 42b. In this form, the turbine controlled governor 41 may be connected by means of a link 42 with an equalizer lever 42a, and the gas valve controller 42b may be connected with the other end of this equalizer lever 42a. This equalizer lever may be pivotally connected by means of a link 42c with the end of an equalizer 43, to the other end of which is connected a link actuated by the pump speed controlled governor 44. The lever 43 has a lost motion connection 45 with an arm 46 of a switch actuating lever 47 pivotally mounted at 48. An increase in the gas valve opening moves the link 42b to the left. An increase in speed of the governor 41 moves the link 42 to the right. An increase in speed of the governor 44 moves the lower end of the equalizer 43 to the right. In this form, since the switch actuating lever 47 itself is subjected to a triple control, the switches 49, 50, and 51, may be mounted in fixed position. These switches are so arranged that they will be actuated, one after another, by the front edges of the four-step lever and so that each switch after being actuated will remain in its abnormal shifted position when the succeeding switches are later actuated. It will be seen that a result is accomplished by this arrangement similar to the result accomplished by the arrangement shown in Figs. 1–6, incl.

In Fig. 8 is shown a diagram of the wiring which may be used with the construction of Fig. 7. The switches 49, 50, and 51, are automatically controlled, and the switches 52, 53, and 54 may be controlled manually or by pedal controlling a lever similar to the lever 47, so as to be successively placed in abnormal position by continued movement of an operating member. Both in Figs. 6 and 8, a fluid coupling or torque converter 39 is shown as placed ahead of the transmission. Assuming, as in Fig. 6, that the automatic switches 49, 50 and 51 are spring-biased to lie in the left-hand position and that the manual switches 52, 53, and 54 are spring biased to lie in the right-hand position, it will be seen that when none of the switches are operated against the spring biasing action, the circuit will be from the battery through the manual switch 52 and automatic switch 49 to the left-hand low speed control 55. If, now, the relation of turbine speed to pump speed becomes such that the switch 50 is moved to right-hand position, the gear shift controller 55 will be deenergized and the controller 56 will be energized to place the car in next to low speed. If, now, the relation of turbine speed to pump speed becomes such that the switch 49 has moved to the right-hand position, the controller 56 will be de-energized and the third gear shift actuator 57 will be energized to place the car in next to high speed. If, now, the relation of turbine speed to pump speed becomes such that the switch 51 is moved to its abnormal right-hand position, the third gear shift actuator 57 will be de-energized, and the fourth gear shift actuator 58 will be energized to place the car in high speed.

If, now, the operator should desire to overrule the automatic actuation, he depresses a pedal or shifts a lever, similar to the lever 47, which will successively shift the switches 52, 53, and 54 to their left-hand position. When the first switch 52 is shifted to the left, it disconnects the automatic control and places the next-to-high actuator 57 in energized condition, the circuit being through the switch 52, switch 53, and conductor 59. If, now, the left-hand pedal is further depressed so that both of the switches 52 and 53 are placed in their abnormal left-hand position, the next-to-low gear shift actuator 56 will be energized, the circuit being through the switches 52, 53 and 54 to the conductor 60. If, now, the left-hand foot pedal is still further depressed so that all three of the switches 52, 53, and 54 are in their abnormal left-hand position, the low gear shift actuator 55 will be energized, the circuit being through the switches 52, 53, and 54, and conductor 61.

The construction shown in Fig. 9 is substantially the same as that shown in Fig. 7 except that here the switch actuating lever carrying the equalizer lever 47 is controlled by car torque and motor speed rather than by turbine speed and pump speed.

It will be seen that the construction and circuit arrangement disclosed prevents any possibility of a time overlap of any two controls and also prevents any possibility of a time gap between any two controls. It will also be seen that an extremely small movement of the control members will effect a shift from one gear ratio to another, since the snap action of the switch may be effected by a movement of less than .001" of the push button 23. This enables accurate control of the gear shift with a relatively small range of movement of the control members.

The control apparatus shown herein might be used to control various forms of hydroplanetary transmissions such as shown in my copending applications Serial No. 370,045 and No. 387,174.

The transmission shown in Fig. 10 comprises a drive shaft 58, a driven shaft 59, a gear carrier 60 connected to the drive shaft 58, planet gearing 61 mounted on this gear carrier, a ring gear 62 meshing with the planet gearing and keyed to the driven shaft 59, a sun gear 63 meshing with the planet gearing, a pump rotor 64, a clutch housing 65 secured to rotate with the pump rotor 64, a two-way clutch 66 which, in one condition, connects the clutch housing 65 to rotate with the gear carrier 60, and, in another condition, connects the clutch housing to rotate with the sun gear 63, a turbine rotor 67 keyed to the driven shaft 59, a one-way reaction stato-rotor 68 acting between the pump rotor and turbine rotor, a one-way anchorage device 69 for preventing reverse rotation of the stato-rotor, and a clutch 70 for connecting and disconnecting the pump rotor 64 with respect to the stator 68. Suitable electric controllers 71 and 72 are provided for controlling the two-way clutch 66 and another electric controller 73 for controlling the rear clutch 75.

When the controller 72 is energized, two-way clutch 66 is positioned to connect the pump rotor 64 with the gear carrier 60, the drive is from the motor shaft 58, through the gear carrier 60, pump rotor 64, stato-rotor 68, and turbine rotor 67 to the driven shaft 59. When the controller 71 is energized two-way clutch 66 is positioned to connect the pump rotor 64 with the sun gear 63, the power flow is divided. One path is from the motor shaft 58, through the gear carrier 60, planet gearing 61 and ring gear 62 to the driven shaft 2. The other path is from the drive shaft 1, through the gear carrier, planet gearing 61, sun gear 63, pump rotor 64, stato-rotor 68, and turbine rotor 67 to the driven shaft 59. In this position the torque multiplication is less than in the first position, but an increase in efficiency results, since only a fraction of the power goes through the hydraulic part of the transmission.

When controller 73 is energized, the clutch 70 is operated to connect the stato-rotor 68 with the pump rotor 64, and the hydraulic part of the transmission ceases to act as a hydraulic torque converter and begins to operate as a hydraulic coupler.

Further modifications will be apparent to those skilled in the art and it is desired, therefore, that the invention be limited only by the scope of the appended claims.

Having thus described my invention, what I claim and desire to secure by Letters Patent is:

1. A gear shift control apparatus comprising an accelerator control pedal, a circuit controlling device movable back and forth in a definite path, whose position is determined by the position of the pedal, a second circuit controlling device movable back and forth in a definite path into and out of engagement with said first device, speed controlled means for determining the position of said second device, means for varying the speed ratio of a power transmission, and means controlled by the engagement and disengagement of said circuit controlling devices for controlling said speed ratio varying means, one of said movable devices comprising a two-way snap switch having a snap action in both directions and spring biased to move normally in one direction, the other movable device comprising a contact member for engaging the switch to move it against said spring biasing action, the two branches from the two-way switch being connected to said speed ratio varying means to effectuate different speed ratios.

2. In a control apparatus for variable speed-ratio transmissions, an electrical operating device for selecting one from a number of different speed-ratios, an electric circuit which when energized causes said operating device to act to select a speed-ratio, and means for controlling the energization and deenergization of said circuit comprising two members movable relatively to each other, a first one of said members comprising a buckling action leaf spring contact making and breaking member having a snap action in both directions due to the buckling action and normally biased to open said circuit, the other of said members being engaged by said first member in their relative movement and held in engagement therewith during a substantial part of said movement to cause a buckling action of said leaf spring contact member to close said circuit and hold it closed during said substantial part of said relative movement, whereby a slight relative movement of said members will effect a snap action of said leaf spring member to close said circuit, and further relative movement will hold the circuit closed.

3. In a control apparatus for variable speed-ratio transmissions, two electrical operating devices, two electric circuits, one for each operating device, each of which, when energized, causes its operating device to act to select a speed ratio, and means for causing the energization and deenergization of said circuits comprising two members movable relatively to each other, a first one of said members comprising a buckling action leaf spring contact-making and breaking member having a snap action in both directions due to the buckling action, and two contacts alternatively engageable by said leaf spring member, said leaf spring member being normally biased to engage a first one of said two contacts, the other of said relatively movable members being engaged by said first member in their relative movement and held in engagement therewith during a substantial part of said relative movement to cause a buckling action of said leaf spring contact member to cause it to snap out of engagement with said first contact and into engagement with said second contact, and to hold it in engagement with said second contact during said substantial part of said movement, a supply circuit connected with said buckling contact member, said two contacts being electrically connected with said two circuits respectively to energize them alternatively, whereby there will always be one of said operating devices energized, except during the snap buckling action of the leaf spring member and whereby there can never be two of said operating devices energized simultaneously.

4. A gear shift control apparatus comprising an accelerator control pedal, an oscillatably mounted circuit controlling device movable back and forth in a definite path, whose position is determined by the position of the pedal, a second circuit controlling device movable back and forth in a definite path into and out of engagement with said first device, speed controlled means for determining the position of said second device, means for varying the speed ratio of a power transmission, and means controlled by the engagement and disengagement of said circuit controlling devices for controlling said speed ratio varying means, one of said movable devices comprising a two-way snap switch having a snap action in both directions and spring biased to move normally in one direction, the other movable device comprising a contact member for engaging the switch to move it against said spring biasing action, the two branches from the two-way switch being connected to said speed ratio varying means to effectuate different speed ratios.

5. A gear shift control apparatus comprising an accelerator control pedal, an oscillatably mounted circuit controlling device movable back and forth in a definite path, whose position is determined by the position of the pedal, a second oscillatably mounted fluid circuit controlling device coaxial with said first device movable back and forth in a definite path into and out of engagement with said first device, speed controlled means for determining the position of said second device, means for varying the speed ratio of a power transmission, and means controlled by the engagement and disengagement of said circuit controlling devices for controlling said speed ratio varying means, one of said movable devices comprising a two-way snap switch having a snap action in both directions and spring biased to move normally in one direction, the other movable device comprising a contact member for engaging the switch to move it against said spring biasing action, the two branches from the two-way switch being connected to said speed ratio varying means to effectuate different speed ratios.

6. In a control apparatus for variable speed-ratio transmissions, an electrical operating device for selecting one from a number of different speed-ratios, an electric circuit which when energized causes said operating device to act to select a speed ratio, and means for controlling the energization and deenergization of said circuit comprising two members movable relatively to each other and mounted for oscillation about a common axis, a first one of said members comprising a buckling action leaf spring contact making and breaking member having a snap action in both directions due to the buckling action and normally biased to open said circuit, the other of said members being engaged by said first member in their relative movement and held in engagement therewith during a substantial part of said movement to cause a buckling action of said leaf spring contact member to close said circuit and hold it closed during said substantial part of said relative movement, whereby a slight relative movement of said members will effect a snap action of said leaf spring member to close said circuit, and further relative movement will hold the circuit closed.

7. In a control apparatus for variable speed-ratio transmissions, two electrical operating devices, two electric circuits, one for each operating device, each of which, when energized, causes its operating device to act to select a speed ratio, and means for causing the energization and deenergization of said circuits comprising two members movable relatively to each other and mounted for oscillation about a common axis, a first one of said members comprising a buckling action leaf spring contact-making and breaking member having a snap action in both directions due to the buckling action, and two contacts alternatively engageable by said leaf spring member, said leaf spring member being normally biased to engage a first one of said two contacts, the other of said relatively movable members being engaged by said first member in their relative movement and held in engagement therewith during a substantial part of said relative movement to cause a buckling action of said leaf spring contact member to cause it to snap out of engagement with said first contact and into engagement with said second contact, and to hold it in engagement with said second contact during said substantial part of said movement, a supply circuit connected with said buckling contact member, said two contacts being electrically connected with said two circuits respectively to energize them alternatively, whereby there will always be one of said operating devices energized, except during the snap buckling action of the leaf spring member and whereby there can never be two of said operating devices energized simultaneously.

8. In a control apparatus for variable speed-ratio transmissions, two electrical operating devices, two electric circuits, one for each operating device, each of which, when energized, causes its operating device to act to select a speed ratio, and means for causing the energization and deenergization of said circuits comprising two members movable relatively to each other, a first one of said members comprising two switches each having a buckling action leaf spring contact-making and breaking member having a snap action in both directions due to the buckling action, at least one of said switches having two contacts alternatively engageable by said leaf spring member, said buckling contact member being normally biased to engage a first one of said two contacts, the other of said switches having at least one contact engageable and disengageable by its leaf spring contact member, the other of said relatively movable members being engaged by said first member in their relative movement and held in engagement therewith during a substantial part of said relative movement to cause a successive buckling action of said leaf spring contact members to cause the leaf spring contact of said other switch to engage its contact and to hold it in engagement during said substantial part of said movement and to cause the buckling contact member of said one switch to snap out of engagement with one of its contacts and into engagement with the other, a supply circuit connected with the buckling contact member of said other switch, the engageable contact of said other switch being electrically connected with the buckling contact member of said one switch, said two alternatively engageable contacts being electrically connected with said two circuits respectively to energize them alternatively, whereby when said spring contact of said other switch is in engagement with its contact there will always be one of said operating devices energized, except during the snap buckling action of the leaf spring members and whereby there can never be two of said operating devices energized simultaneously.

WILLARD L. POLLARD.